(12) United States Patent
Fluhrer et al.

(10) Patent No.: US 7,924,545 B2
(45) Date of Patent: Apr. 12, 2011

(54) APPARATUS FOR CONTROLLING ATMOSPHERIC HUMIDITY

(76) Inventors: Helmut Fluhrer, New York, NY (US); Elena Davydova, New York, NY (US); Yuri Saveliev, New York, NY (US)

( * ) Notice: Subject to any disclaimer, the term of this patent is extended or adjusted under 35 U.S.C. 154(b) by 226 days.

(21) Appl. No.: 12/332,273

(22) Filed: Dec. 10, 2008

(65) Prior Publication Data

US 2010/0142112 A1 Jun. 10, 2010

(51) Int. Cl.
*H05F 3/00* (2006.01)
(52) U.S. Cl. ....................................... 361/231; 361/212
(58) Field of Classification Search .................. 361/212, 361/213, 231
See application file for complete search history.

(56) References Cited

U.S. PATENT DOCUMENTS

| 1,991,236 | A | * | 2/1935 | Van de Graaff | 310/308 |
| 3,514,644 | A | * | 5/1970 | Fonberg | 310/10 |
| 4,961,880 | A | * | 10/1990 | Barker | 252/644 |
| 5,818,891 | A | * | 10/1998 | Rayburn et al. | 376/107 |
| 2004/0232801 | A1 | * | 11/2004 | Jerale | 310/309 |

* cited by examiner

*Primary Examiner* — Danny Nguyen
(74) *Attorney, Agent, or Firm* — Fox Rothschild LLP; Gerard P. Norton; M. Michael Lewis

(57) ABSTRACT

An apparatus for modification of the atmospheric humidity profile via creating updrafts of moistened air is provided. The apparatus is based on a capacitor of a Van der Graaf generator which, with the aid of air ionizers comprising a source of alpha particles, produces a unipolar atmospheric electric current of a magnitude sufficient to achieve selective moisture transport. Operating such an apparatus augments or creates a moisture updraft, which may lead to the formation of new clouds and/or an increase in supersaturation in existing clouds, thus enhancing the development of precipitation and/or facilitating the inflow of the evaporated moisture from a water reservoir inland.

2 Claims, 5 Drawing Sheets

APPARATUS FOR CONTROLLING ATMOSPHERIC HUMIDITY

FIELD OF INVENTION

Figure 1:
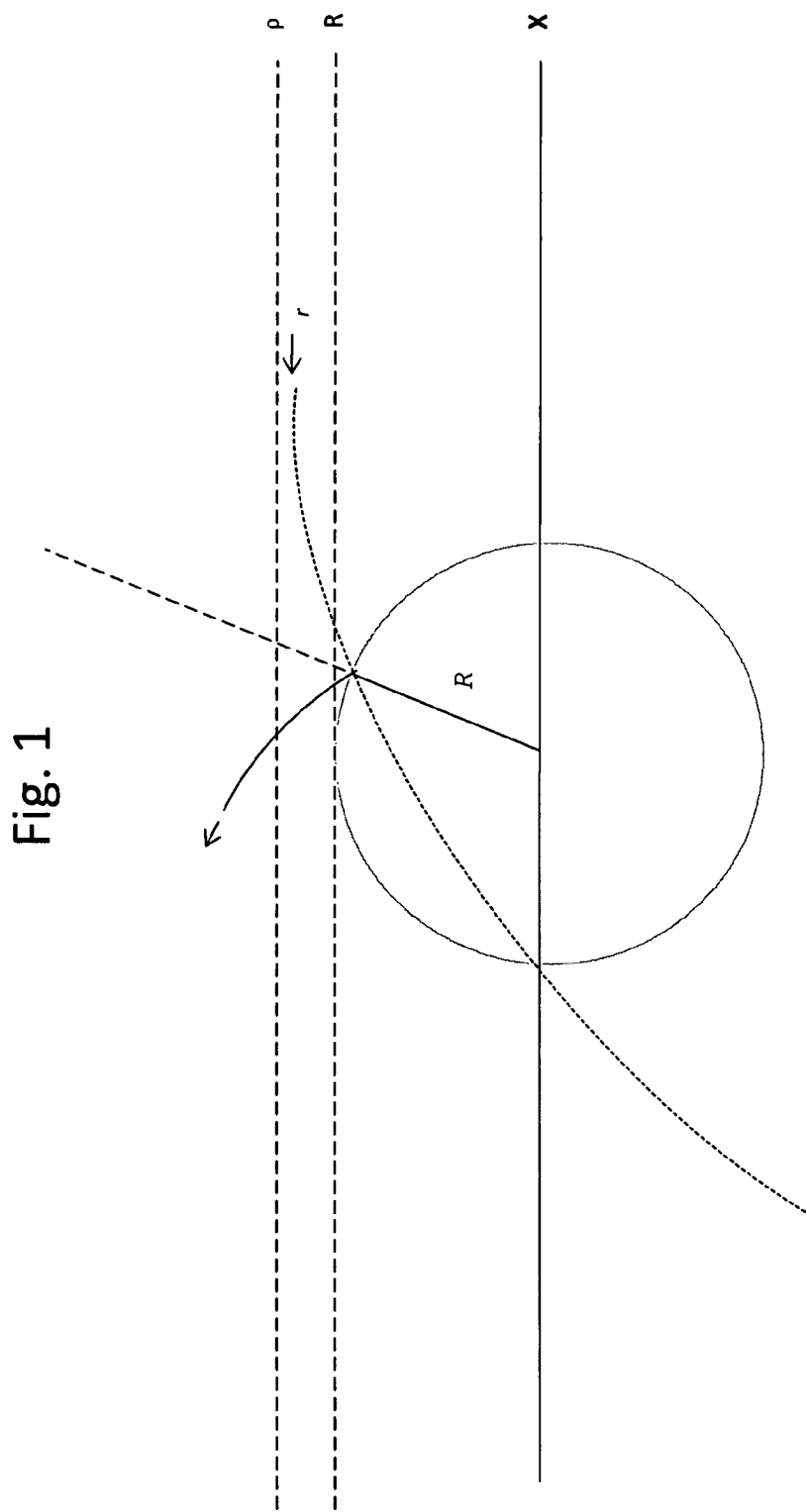

The present invention is generally directed to an apparatus for creating an upward flux of moistened air for use in the field of weather modification.

BACKGROUND OF THE ART

At present, weather modification methods, known as seeding methods, are generally based on introducing small particles of a specific medium into clouds. The particles of seeding media are typically delivered to clouds by airborne carriers such as aircrafts or rockets, or with the aid of natural updrafts such as orographic lifting. Seeding methods are also deployed for the dissipation of fog, which is actually a cloud with no bottom boundary when located on the surface of the Earth. Clouds consist of water droplets, ice particles, or a mixture of both, suspended in the air, which are formed when the air temperature falls below dew point, causing relative humidity (RH) of the air to exceed 100%, i.e. vapor supersaturation.

There are two primary ways to seed clouds. The first method is based on enhancing the coalescence (a process of merging droplets into bigger ones) of the rain formation process. Seeding particles introduced into a cloud grow in size by coalescing with droplets in their path, eventually becoming large and heavy enough to fall as precipitation. The second method of seeding clouds employs the ice-crystal (Bergeron) process. Small particles of silver iodide are introduced into a cloud that generally contains both ice crystals and supercooled water droplets. Silver iodide particles are ice nuclei since they act like ice crystals by depositing vapor onto themselves. As the equilibrium vapor pressure over ice is lower than that over water, ice nuclei may further grow at the expense of surrounding liquid droplets, absorbing more vapor compared to the case of condensation. The growing crystals eventually become heavy enough to fall as precipitation.

Alternative methods for cloud and fog modification are based on enhancing coalescence by introducing electric forces via droplet charging or deploying other charged aerosols.

Numerical modeling and experimental observations suggest that, to be effective in enhancing coalescence, charged aerosol particles (typically droplets) should each carry hundreds of elementary charges. Such droplets are referred to hereinafter as supercharged droplets. Approaches to the problem have focused on creating devices to supercharge droplets which are then to be used as seeding media for cloud modification. In practice, however, producing supercharged droplets at the rate required to seed a reasonable volume of cloudy or foggy air would meet with severe engineering difficulties. Seeding charged particles into clouds, as with any traditional seeding technique, usually requires deploying airborne carriers which leads to high associated costs. Furthermore, seeding large volumes of cloudy air may need to be repeated due to the limited lifetime of the supercharged state of particles. Some other problems associated with dispensing highly charged particles into the atmosphere have been discussed in detail by Vonnegut at al. (1967).

Accordingly, there is still a need in the art for improved methods and devices for weather modification.

SUMMARY

The inventive apparatus for weather modification may be used to create upward moisture flux, which may cause modification of the vertical humidity profile by increasing relative humidity at higher altitudes at the expense of drying the air near the surface of the Earth. The process may occur even in a stable atmosphere when the convective updrafts normally responsible for the vertical transport of humid air do not form. An upward moisture flux achieved by deploying the inventive apparatus may lead to the formation of new clouds and/or to supersaturation in existing clouds, thus enhancing the development of precipitation and/or facilitating the inflow of the evaporated moisture from a water reservoir inland.

The instant apparatus comprises a Van der Graaf generator (VDGG) having a capacitor and grounded charging engine and one or more air ionizers, such as a source of alpha particles, located in the vicinity of the capacitor. Preferably, the elevation distance of the capacitor is equal to about the ion propagation distance. The one or more air ionizers are disposed along the bottom half of the capacitor.

To improve efficiency of the inventive apparatus, a ventilation hole may be positioned substantially near the top of the capacitor and at least one fresh air conduit may be provided to facilitate fresh air supply from inside the capacitor. Preferably, at least one fresh air conduit is provided near each of the one or more air ionizers. The fresh air conduits may be positioned on each air ionizers or between about an alpha particle range to two times the alpha particle range from the air ionizers.

The apparatus may be powered by a source of renewable energy.

BRIEF DESCRIPTION OF THE FIGURES

FIG. 1 shows the effect of the increased collision cross-section for water molecules due to attractive electric forces.

FIG. 2 presents one embodiment of the inventive apparatus.

FIG. 3 presents a plot for air ionization by a source of radiation as a function of distance from this source.

FIG. 4 presents a plot for atmospheric current produced by a source of radiation in the electric field between two plates of a capacitor as a function of the voltage on this capacitor.

FIG. 5 presents one embodiment of mounting air conduit and air ionizers on the surface of the spherical capacitor.

FIG. 6 illustrates another embodiment of the apparatus aimed at reduction of the mixing of the ascending moistened and the incoming fresh air flows.

DETAILED DESCRIPTION

Under certain conditions atmospheric vapor may be out of aerostatic equilibrium, which results in an upward force being exerted on a volume of air (Makarieva et al., 2007). Conditions for this process include (1) evaporation that is sufficiently intensive, in particular to saturate vapor through the atmospheric column up to a sufficiently high altitude; and (2) the atmospheric temperature lapse rate $\alpha=\partial T/\partial z$ (reduction of temperature T with altitude z) being greater than a critical value $\alpha_o=T_sM_wg/Q_w$, where $T_s$ is the absolute dew point temperature at the surface of the Earth, $M_w=1.8\times10^{-2}$ kg $mol^{-1}$ is the molar mass of water, $g=9.8\ ms^{-1}$ is the acceleration of gravity, and $Q_w=44$ kJ $mol^{-1}$ is the molar latent heat of evaporation for water. At sea level, standard temperature $T_s=288°$ K. (+15° C.), the value for $\alpha_o$ is 1.15 K $km^{-1}$ and $\alpha_o$ does not typically exceed 1.3 K $km^{-1}$. The condition $\alpha>\alpha_o$ is satisfied in most cases of ambient values of $\alpha$ and T, even for absolutely stable layers ($\alpha_o<\alpha<6$ K $km^{-1}$) when convection typically does not occur.

At any altitude, actual vapor pressure eventually cannot exceed the pressure of saturated vapor as any moisture excess in the air is removed by vapor-to-liquid and possibly vapor-to-ice phase transition processes. This limitation on vapor pressure, governed by the vertical temperature profile where $\alpha > \alpha_o$, assures that at any altitude the partial pressure of vapor is greater than the pressure of vapor mass in the atmospheric column above this altitude, bringing the vapor out of aerostatic equilibrium. In terms of differential equations this means that the vertical gradient of the partial pressure of vapor is greater than the weight of a unit volume of vapor at any altitude. This difference appears as a force acting on a volume of moist air, causing an updraft.

The abovementioned removal of excess moisture in a volume of air by phase transitions occurs when the partial pressure of vapor at an altitude initially exceeds the vapor saturation pressure at a temperature determined by a given temperature profile. The air becomes supersaturated with vapor and thus subject to a phase transition. Condensation of vapor into liquid water starts on atmospheric aerosol particles acting as condensation nuclei, which grow into liquid droplets at the expense of vapor until the air is no longer super-saturated. Areas of droplet-laden air appear as clouds. Droplets may further be merged, via the collection of smaller droplets by a larger droplet (collector) that is moving, usually due to the force of gravity. This process, known as coalescence, causes droplets to grow until they are large enough to fall as rain.

At temperatures below the freezing point for water (0° C.), droplets are super-cooled, i.e. they may remain in a liquid state down to extremely low temperatures (as low as −39° C.). Some super-cooled droplets may freeze and further grow by freezing the vapor onto ice, via a process known as deposition. Deposition of vapor is a phase transition process, in this sense analogous to condensation. Ice particles may also merge with super-cooled droplets and drops, causing the latter to freeze. This process of collecting ice and liquid water particles into larger ice particles, called riming, in this sense is analogous to coalescence, but is also a phase transition (liquid water to ice) process. These processes of supersaturated moisture removal and release of latent heat at temperatures below the freezing point of water will be additional to the condensational moisture removal and latent heat release. Furthermore, such ice-related processes may be dominant over condensation in forming the updraft under consideration as vapor deposition pressure in the presence of ice particles is lower than the vapour condensation pressure in the presence of liquid droplets, and particle collection via riming, in contrast to coalescence of droplets, is accompanied by the release of additional latent heat. The produced ice-based particles may fall as solid precipitation or as rain if they melt before reaching the surface of the Earth.

Latent heat released in the removal of excess moisture by phase transitions increases the buoyancy of air and thus augments the initial updraft caused by the discussed aerostatic non-equilibrium of vapor. Maintaining this process requires a continuous and sufficient supply of vapor from the surface of the Earth. In contrast, if the atmosphere is stable and, at the same time, the intensity of evaporation on the surface is insufficient to maintain the above process, which is often the case, an updraft is not produced.

Accordingly, an apparatus is disclosed for providing a continuous upward vapor flux to produce or augment an updraft of vapor. To achieve this, the instant apparatus causes extraction of the vapor from the air at lower altitudes to moisten the air at higher altitudes.

Without being bound by theory, it is believed that a mechanism of selectively transporting the water vapor component of atmospheric air, which is responsible for such modification of the vertical humidity profile, is as follows. Air molecules acquire a momentum transferred from a moving ion by scattering. In the absence of an electric field, this process is random (Brownian) and the average macroscopic momentum transfer is zero. However, if the motion of ions is organized to be in the same direction, e.g. by having unipolar, i.e., predominantly of the same sign, ions driven by a sufficiently strong electric field, this ion-to-molecule momentum transfer appears on a macroscopic scale as a force exerted on the air by the applied atmospheric electric current, causing the air to flow. This phenomenon is known as "ion wind" generation.

Applicants have unexpectedly discovered that, under certain conditions, the generated "ion wind" accelerates water vapor to a degree significantly higher compared to other air components. In contrast to molecules of other air components, a molecule of water ($H_2O$) possesses its own electrical dipole moment. Therefore, when colliding with a charged particle, it experiences a charge-to-dipole interaction additionally to the short-range Van-der-Vaalse interaction which is common to all air molecules in collision processes. In this regard, water molecules behave differently during collision (scattering) events on atmospheric ions, and this difference is described in terms of the collision cross section.

Trajectories of water and non-water molecules are shown in FIG. 1, illustrating the effect of the increased collision cross-section for a water molecule, moving parallel to axis X at a distance r from it (scattering distance) towards an air ion of radius R. Non-water molecules moving parallel to the axis X at a distance r from it can be scattered only if $r<R$, so R is their maximum scattering distance. In contrast, due to the additional attractive charge-to-dipole electric force, water molecules with the maximum scattering distance $\rho$ can also be scattered at $R<r<\rho$. The effective cross-section for water molecules determined by $\rho$ is larger than that for other molecules determined by R as $\rho > R$.

The collision cross-sections ratio of water to non-water molecules, called enhancement factor EF, for a range of air ion sizes has been estimated by Nadykto et al., (2003). For ions with diameters 0.6 nm and 1.2 nm, the values for EF were found to be 7 and 2.2 respectively. For the average diameter of air ions of about 0.9 nm, EF≈4. For water molecular clusters with dipole moments larger than those of the water molecule $H_2O$, such as water dimer $(H_2O)_2$ and others $((H_2O)_n, n>2)$ which appear in higher concentrations when vapor is closer to saturation, the values for EF are found to be even higher.

The larger the ion-to-molecule collision cross-section, the larger the number of air molecules that collide with a moving ion and the larger the total momentum transferred to the molecules from the ion per unit of time. The total momentum transferred to molecules of a volume of air per unit of time is the macroscopic force exerted on this volume of air. As the collision cross-section for water molecules is greater (EF>2), and therefore the ion-to-molecule momentum transfer is also greater, the electric force exerted on water vapor will be significantly greater compared to other air components. As a result, the vapor moves ahead of other components in the air flow produced along the electric field lines. This microphysical process of separation of water vapor from other air components by an atmospheric electric current of unipolar ions (unipolar atmospheric electric current or UAEC) is referred to hereinafter as selective moisture transport (SMT). The latter leads to the re-distribution of the available atmospheric vapor and the formation of buoyant parcels of moistened air.

In general, SMT causes an increase in relative humidity in some areas at the expense of it decreasing in others from which the moisture was taken, i.e. closer to the origin of UAEC. Although at first it may be not obvious, an increase in humidity reduces the density of the air and vice versa. This is because the number of molecules of all components in a volume of air is constant at a given temperature and pressure. Adding or removing water vapor with a molar mass of $1.8 \times 10^{-2}$ Kg mol$^{-1}$, which is lower than the molar mass of air of about $2.9 \times 10^{-2}$ Kg mol$^{-1}$, will respectively reduce or increase the mass per unit volume of the air, i.e. its density. According to Archimedes' principle, dehydrated air parcels descend while moisturized ones ascend. In this way, the moisture separation achieved with the aid of a locally generated UAEC appears as upward moisture transport on a larger scale, ultimately due to the forces of gravity and reasonably long lifetimes of air parcels with artificially modified humidity. The ascending moistened air will reach saturation at and above a certain altitude, and the initial updraft may further be augmented by latent heat release and aerostatic non-equilibrium of vapor as discussed previously.

Generating an atmospheric electric current requires producing atmospheric ions acting as current carriers and a source of electric field which drives the ions.

All air ionization methods are based on moving electrons between gas molecules. If a gas molecule loses an electron, it becomes a positively charged molecular ion. If a gas molecule gains an electron, it becomes a negatively charged molecular ion. Within nanoseconds, molecular ions bind up to 10 molecules of water and possibly some trace gases, forming small air ions.

Accordingly, the instant apparatus includes one or more air ionizers. Preferably, the air ionizer component utilizes high energy particles produced in the process of radioactive decay. In general, the radioactive decay produces alpha, beta, and gamma emissions ionizing the air by moving electrons. Radioactive decay produces bipolar ionization, i.e., ions of opposite sighs.

Accordingly, the one or more air ionizers comprise a source of high energy particles in form of a radioactive solid substance. Suitable substances include, but are not limited to, isotopes of americium, polonium, plutonium, uranium, thorium, actinium, radium, or combinations thereof, with Americium-241 ($^{241}$Am), Plutonium-239 ($^{239}$Pu), or Plutonium-238 ($^{238}$Pu) being the preferred substances. In practice, alloys of the said isotopes with a corrosion resistant metal compound, for example nickel-chrome based, are preferred.

Alpha radiation is the main source of air ionization by radioactive decay. The alpha particle, a helium nucleus consisting of two neutrons and two protons, collides with air molecules knocking out electrons, until it loses its energy over a definite distance in the air. Such a distance, referred to hereinafter as the alpha particle range, is defined as the distance traveled by the alpha particle before it loses its energy. The alpha particle range is determined by the energy of alpha particles which is specific for a particular substance of the source. For example, alpha particles produced by $^{241}$Am have the energy of about 5.48 MeV and a range of about 3 cm, limiting the air ionization zone by this distance. Plutonium isotope $^{239}$Pu produces practically only alpha particles with the energy of about 5.15 MeV.

Air molecules that lose electrons become positive molecular ions. The free electrons do not exist in air for very long before they are captured by neutral gas molecules, forming negative molecular ions. Molecular ions are further clustered into small air ions. Alpha ionizers produce bipolar ionization, which means that positive and negative ions are always created in equal numbers.

Producing ions alone, however, is not sufficient for the SMT to occur, even if they are produced in large amounts. In order to produce UAEC, an electric field may need to be generated to dissociate ions of opposite signs and to form an atmospheric electric current of the ions with preferred sign. Accordingly, the instant apparatus also comprises a static electric field generator.

Generating a static electric field can be achieved by accumulating electric charges of the same sign in some area of space, typically in an electrically conductive object confining the charges, acting as a charge capacitor or electrically coupled to a charge capacitor and acting as a charged electrode.

The generated electric field causes ions with the opposite charge as the capacitor to drift towards and recombine on the capacitor or electrode. For ions with the same charge, this field drives them away from the capacitor thus forming a UAEC at distances from the capacitor greater than the thickness of the air ionization zone limited by the alpha particle range. Such a continuous charge separation and removal of ions signed oppositely to ions of the produced UAEC, which prevents the direct recombination of ion pairs, is maintained by charging the capacitor.

In principle, the sign of the accumulated charge may be either positive or negative, but generating a current of negative ions is preferred because the latter achieve higher velocities in an electric field.

To produce a UAEC in the above method, the air ionizers are preferably located in the vicinity of or, preferably, on the surface of the charged capacitor or charged electrode. The air ionization zone is the zone within the alpha particle range from the air ionizer. The term "vicinity" means the distance from the capacitor so the electric field generated by the capacitor in the air ionization zone is sufficiently strong to dissociate the opposite sign ions.

Compared to the short range of alpha particles, ranges of generally less energetic beta and gamma emissions are much longer, which makes it technically difficult to achieve the separation of the bipolar ionization produced by beta and gamma emissions with a static electric field. Furthermore, producing intensive long-range beta and gamma radiations is not desirable as it may require radiation safety procedures at distances over the alpha particle range. Therefore, radioactive materials providing the highest alpha and lowest beta and gamma radiation outputs are preferable.

Figure 4:
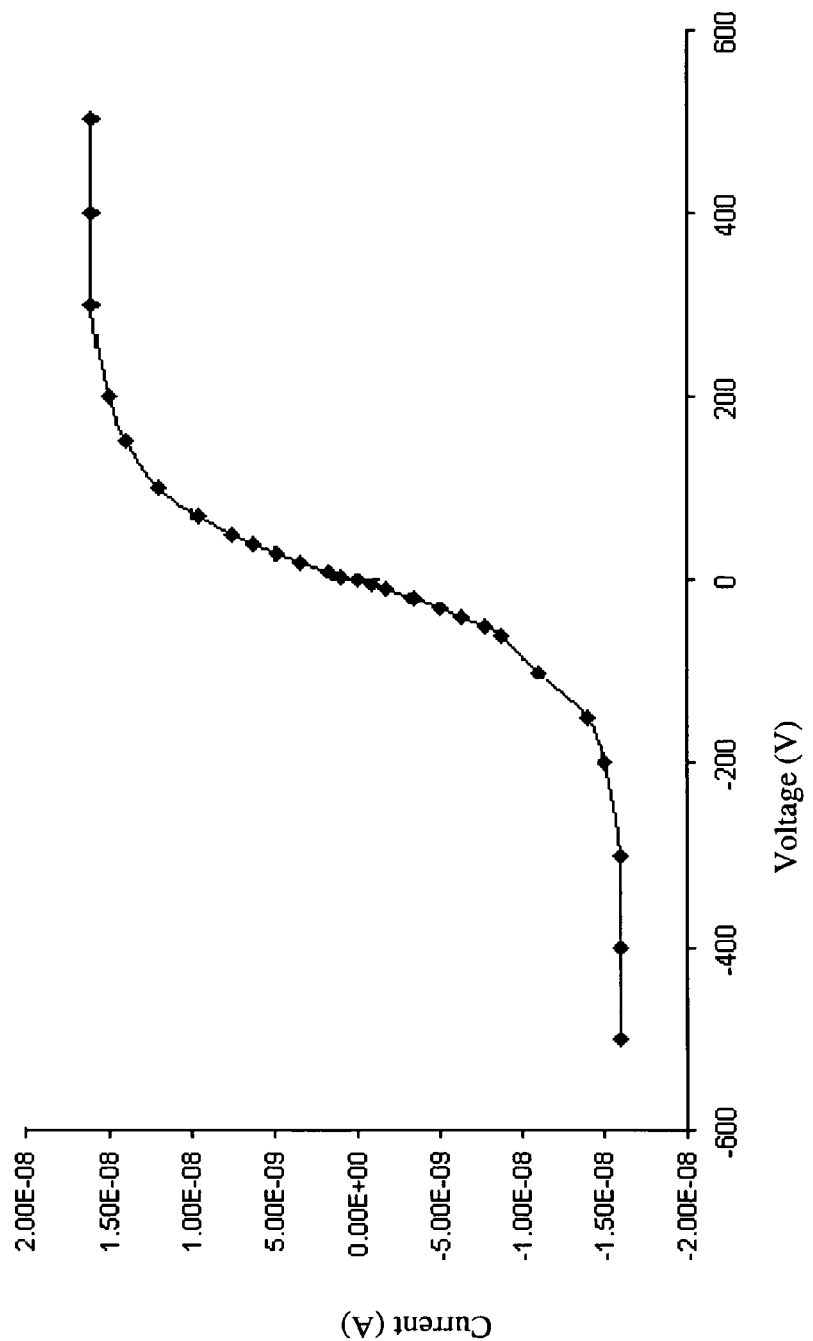

To determine the strength of electric field sufficient to dissociate the bipolar ionization, the atmospheric electric current may be measured at different values of electric field strength. For example, a plot for the atmospheric current produced by a 0.9 µCi $^{241}$Am source from a typical smoke alarm in the applied electric field produced between the plates of a capacitor is given in FIG. 4. The distance d between the plates is 3 cm (the maximum ionization distance is within the produced electric field) and the measurements are taken at different values of the voltage on the capacitor. The complete dissociation of bipolar ionization corresponds to the saturation of atmospheric current which occurs, as shown on the plot, at capacitor voltage U=300 V. The corresponding electric field strength is E=U/d=300/0.03=10 kV/m. This is the minimum value for the required strength of the electric field to be achieved for this particular source. In general, sources with a higher radiation output require a stronger electric field.

Figure 2:
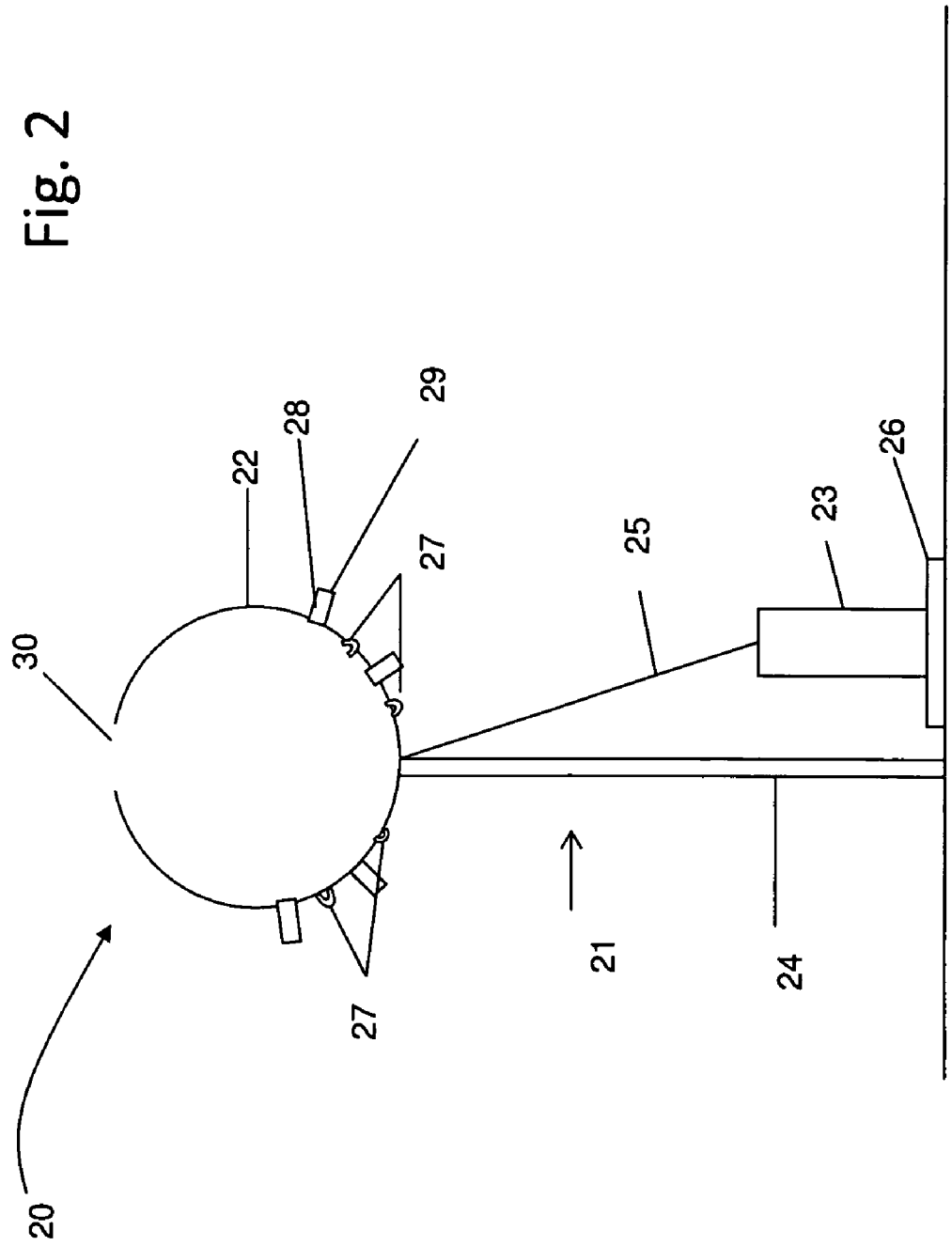

FIG. 2 illustrates an embodiment of the instant apparatus for weather modification 20, suitable for practicing the invention. In this embodiment, the electric field generator comprises a Van der Graaf generator (VDGG) 21 having a preferably spherical capacitor 22 and a charging engine 23 placed on a base 26. The capacitor 22 is elevated above the surface of the Earth by a non-conductive support structure 24. The charging engine 23 is coupled to the capacitor 22 with an electrical conductor 25. The base 26 of the charging engine 24 is grounded.

One or more air ionizers with sources of alpha ionization 27, preferably in the form of flat sheets of radioactive substance, may be disposed on or near the surface of the bottom hemisphere of a capacitor 22. The capacitor 22 is preferably made from a corrosion resistant metal. It is preferable that air ionizers are made from an alloyed metal comprising the same metal that the capacitor is made from and an alpha radioactive element. In this configuration, negative ions will flow away from the capacitor tending aside of it and towards the surface of the Earth which acts as a collector electrode for these ions, if the capacitor is negatively charged.

Figure 3:
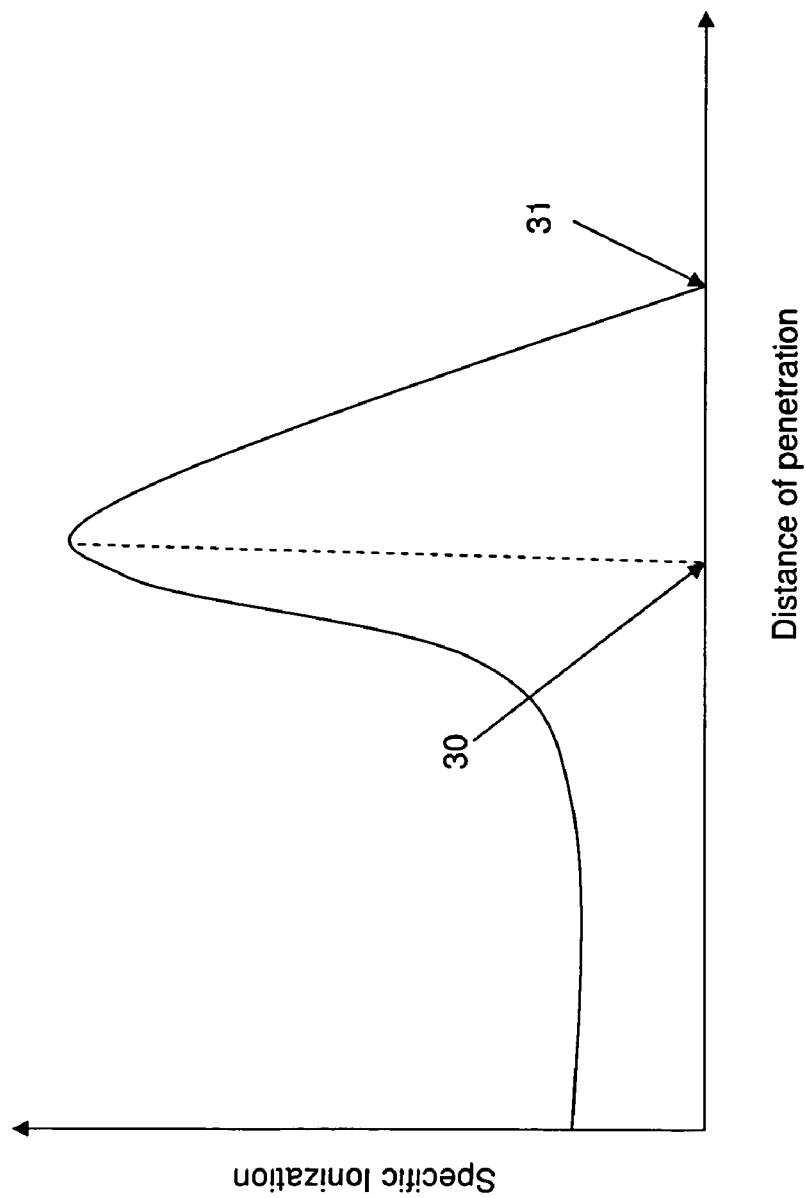

Since the energy loss of the alpha particle per ion pair formed is nearly constant, the specific ionization, i.e. number of ion pairs produced per unit length of the particle path, is proportional to the rate of the loss of alpha particle energy E with the distance of penetration x, $-dE/dx$, and so a plot for ionization as a function of the distance of penetration is of the Bragg curve shape as shown in FIG. 3.

As shown in FIG. 3, most bipolar ionization is produced at some distance from an ionization source, referred to hereinafter as the maximum ionization distance. Referring to FIG. 3, the maximum ionization distance extends from point 30 up to the source-specific alpha particle range, indicated as 31.

Depending on the capacitor's size and charging engine design, a voltage up to several megavolts can be achieved on a VDGG capacitor. The strength of electric field is sufficient to dissociate the opposite sign ions. The voltage U on spherical capacitor of radius R is related to the accumulated charge q as $U=q/4\pi\in R$, where $\in=8.85\times10^{-12}$ F/m is the dielectric permittivity of the air. At the same time, the electric field strength E at the distance $r>R$ from the capacitor's center is related to q as $E=q/4\pi\in r^2$, therefore $E=UR/r^2$. For example, if the capacitor with a radius of 0.8 m is operating at a voltage of 2 MV, the electric field strength at a distance of 3 cm from its surface (about maximum ionization distance) is 2.32 MV/m. The electric field of this strength is sufficient to dissociate bipolar ionization from radioactive sources with an output much higher that of the source discussed previously as an example.

As mentioned above, the most intensive ion generation by a radioactive source attached to the capacitor occurs in a zone at the maximum ionization distance from the source surface referred to hereinafter as the maximum ionization zone. As a result, two UAECs of opposite polarity ions and associated air flows originate from the maximum ionization zone due to ion dissociation in the electric field. For a negatively charged capacitor, negative ions flow away from the capacitor and positive ions flow toward the capacitor, leading to the formation of a low air pressure layer at distances from the source of about the maximum ionization distance. Bursts of fresh air parcels into the low pressure layer may occur, in particular, between streams flowing out from the alpha ionization sources, which are responsible for the SMT, causing a partial mixing of the moistened and fresh air parcels.

To minimize the latter effect, the following optional modifications to the design may be utilized. Referring back to FIG. 2, conduits 28 to facilitate the fresh air supply from inside the capacitor made of a non-conductive material may be provided near one or more air ionizers 21. Each conduit 28 has an outlet 29, which is preferably positioned in the lower pressure zone (i.e., maximum ionization zone), more preferably between the middle and the outer limit of this zone. The capacitor 22 may also be provided with a ventilation hole 30 on its top. For example, conduits may have a threaded base which is screwed into threaded holes in the capacitor. The rim of the ventilation hole is preferably smooth and preferably shielded with an insulating material to avoid unfavorable corona discharge. By way of a non-limiting example, a rubber or flexible plastic ring with a notch for the rim of the ventilation hole can be used.

Figure 5:
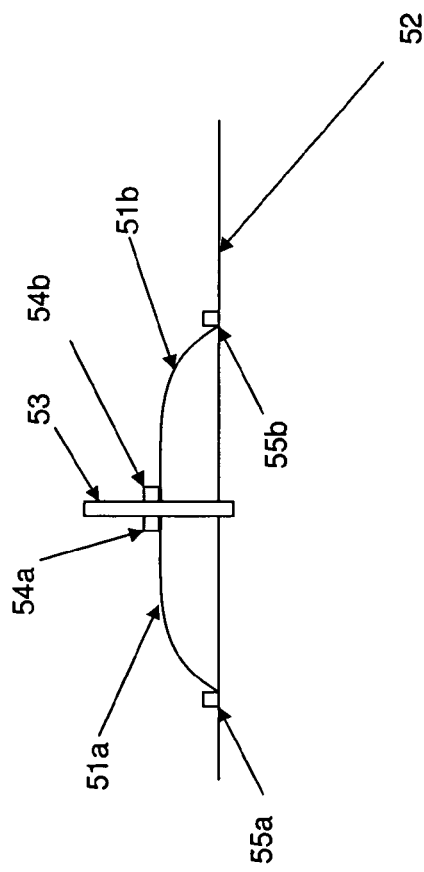

A recommended option to mount alpha radiation sources and conduits is presented in FIG. 5. The shape of the air ionizers 51 corresponds to a section of the top part of the sphere with a radius $r<<R$, where R is the radius of the spherical capacitor 52. Air conduit 53 made of a non-conductive material is screwed into a threaded hole in the capacitor, passing through a hole in the center of the air ionizer. To avoid corona discharge on the edges of the air ionizer, all edges of the air ionizer are made smooth and covered by non-conductive material. The edge of the air ionizer's hole is covered by the conduit's flanges 54a and 54b and the side edge of the air ionizer is also covered by covers 55a and 55b in a similar way to the edge of the capacitor's ventilation hole. Avoiding or minimizing corona discharge is desirable because the production of hazardous gases such as ozone and nitrogen oxides and high corrosive stress are likely to occur on sharp points, especially in a highly ionized environment.

Such configuration may also generate a higher electric field, compared to that of the capacitor, achievable in the ionization zone as the conductive surfaces of the apparatus are equipotential and $r<<R$. In this case where the ionization source acts as a charged electrode electrically coupled to the capacitor, free electrons produced by ionization and accelerated in the electric field may achieve a velocity sufficient to ionize air molecules in their path, the ionization energy of which is about 35 eV. This secondary ionization, also known as amplification, can additionally produce many free electrons and further negative ions for each primary electron that was formed by radiation.

Figure 6:
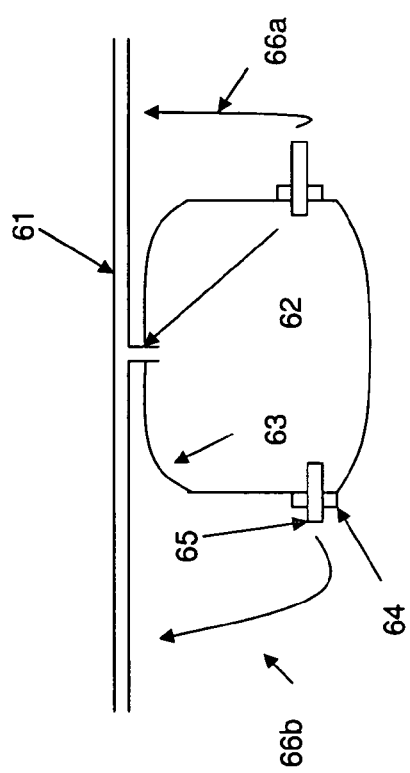

FIG. 6 illustrates another optional modification to the apparatus aimed at the further reduction of the mixing of the ascending moistened and the incoming fresh air flows. In this configuration, one or more conduits 61 are connected to the ventilation hole 62 of the capacitor 63 with air ionizers 64 and air conduits 65 as described above. The conduits 61 extend beyond the zone of the ascending moistened air represented by arrows 66a and 66b.

The height of the capacitor, referred to hereinafter as the elevation distance, is preferably as high as possible to treat a large volume of air and, for increased safety, to minimize beta and gamma ray intensities on the ground. At the same time, the elevation distance preferably does not exceed the distance that small air ions propagate in the applied electric field during their lifetime, i.e. most of them should terminate on the surface of the Earth (the collector).

The ion propagation distance is determined mostly by the attachment of ions to atmospheric aerosol particles, also known as large or heavy ions, which are not moved by the electric field and do not contribute to the SMT. If the elevation is too high, too many immobile large ions may accumulate above the surface as a layer of space charge, which reduces the intensity of the electric field along ion trajectories. The ion propagation distance can be evaluated by measuring the vertical profile of the electric field for a particular system and numerically integrating the ion motion equation over time up to the ion lifetime which can be determined experimentally using well-known methods. Elevating the ion source to a distance between one half and two thirds of the ion propagation distance determined in the abovementioned way is a guide. In some embodiments, depending on the system design and the concentration of pollutants in the air, the elevation distance may vary between several and 10-15 meters, which is also acceptable in terms of radiation safety for a number of typical alpha sources including $^{241}$ Am.

The operation of a typical VDGG is sensitive to leakage currents. Any liquid moisture on the operating equipment can negatively affect the system's performance. As a VDGG produces a nearly constant electric current at a variable voltage on the emitter electrode, leakage currents may cause the voltage to drop below a threshold for effective ion separation. As a result of SMT, drizzle may be produced around the operating apparatus even under clear sky conditions. Condensational moisturizing may also occur on the equipment. To prevent the accumulation of continuous water film on moisture-sensitive parts of the system, including the charging engine of the VDGG and the support for the capacitor and ventilation hole conduits such as rigid structures or a tethering rope which anchors a supporting lighter-than-air craft to the surface of the Earth, these parts may be coated with a water repulsive wax-like substance. Also, techniques to prevent condensational moisturizing, such as, for example, sufficient heating of moisture-sensitive parts is also recommended. Preferably, the charging engine of the VDGG is hermetically sealed.

A source of renewable energy for the generator of atmospheric electric current, such as rechargeable batteries powered by solar panels and/or windmills, is recommended, especially in the absence of a power supply infrastructure.

In another aspect, a method of weather modification is provided, which is based on the modification of vertical humidity profile by increasing the relative humidity at higher altitudes at the expense of drying the air near the surface of the Earth. This method may work even in a stable atmosphere when the convective updrafts normally responsible for the vertical transport of humid air do not form. The method comprises deploying and operating the apparatuses described above. Operating the instant apparatuses augments or creates a moisture updraft, which may lead to the formation of new clouds and/or an increase in supersaturation in existing clouds, thus enhancing the development of precipitation. Operating the apparatus is most efficient in areas of high humidity when the atmosphere is stable and convective updrafts of moist air are weak or absent. Creating strong updrafts of moist air near a shoreline, preferably in the presence of low-level winds from the ocean, would facilitate the inflow of the evaporated moisture from a water reservoir into inland, benefiting the terrestrial hydrologic cycle. For example, such conditions can be found in many locations along the shorelines of Middle Eastern countries.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention which is defined by the following claims.

What is claimed is:

1. An apparatus comprising:

a Van der Graaf generator having a capacitor and a charging engine;

one or more air ionizers disposed in the vicinity of the capacitor;

a ventilation hole positioned substantially near the top of the capacitor; and at least one fresh air conduit, wherein an outlet of one or more conduits extends into a maximum ionization zone.

2. An apparatus comprising:

a Van der Graaf generator having a capacitor and a charging engine;

one or more air ionizers disposed in the vicinity of the capacitor;

a ventilation hole positioned substantially near the top of the capacitor; and at least one fresh air conduit, wherein at least one fresh air conduit is mounted through a hole in the center of the one or more air ionizers.

* * * * *